United States Patent [19]
Storf et al.

[11] Patent Number: 5,288,111
[45] Date of Patent: Feb. 22, 1994

[54] 90 DEGREE ELBOW FOR PNEUMATIC TRANSPORT PIPES

[75] Inventors: Robert Storf, Weingarten; Klaus-Peter Lang, Aulendorf, both of Fed. Rep. of Germany

[73] Assignee: Waeschle Maschinenfabrik GmbH, Ravensburg, Fed. Rep. of Germany

[21] Appl. No.: 863,994

[22] Filed: Apr. 6, 1992

[30] Foreign Application Priority Data
Apr. 16, 1991 [DE] Fed. Rep. of Germany ....... 4112423

[51] Int. Cl.$^5$ ............................................. F16L 43/00
[52] U.S. Cl. ..................................... 285/179; 285/183; 406/195
[58] Field of Search .................. 285/179, 183; 406/195

[56] References Cited
U.S. PATENT DOCUMENTS

| | | | |
|---|---|---|---|
| 4,387,914 | 6/1983 | Paulson et al. | 285/179 X |
| 4,595,319 | 6/1986 | Cook | 285/179 X |
| 4,606,556 | 8/1986 | Metzger | 285/179 X |
| 4,733,889 | 3/1988 | Haines | 285/179 X |
| 4,995,645 | 2/1991 | Pausch | 285/179 X |
| 5,060,984 | 10/1991 | Hess | 285/179 X |

*Primary Examiner*—Dave W. Arola
*Attorney, Agent, or Firm*—Feiereisen & Kueffner

[57] ABSTRACT

A 90° elbow for pneumatic transport pipes includes a tubular asymmetric cross-sectional expansion at the entrance side, a baffle plate along the outer elbow side and a tubular asymmetric cross-sectional contraction at the exit side of the elbow. The baffle plate is arranged at an angle between about 55° and 65° relative to the incoming flow direction of bulk material. The inner elbow side is defined by a quadrantal pipe shell, with the remaining area being complemented by segments to provide a closed cross section.

7 Claims, 3 Drawing Sheets

90 DEGREE ELBOW FOR PNEUMATIC TRANSPORT PIPES

BACKGROUND OF THE INVENTION

The present invention refers to pipe fittings for pneumatic transport pipes, and in particular to an elbow for connecting two pipes at an angle of 90°, with the elbow including a first pipe socket connected to a pipe section with expanding cross-sectional area which is followed by a second pipe socket.

An elbow of this type is known and includes a quadrantal pipe bend with a bag-like cross-sectional expansion at the outer elbow side. The provision of such a bag-like expansion results in a deceleration of the velocity of the entering flow of bulk material. As part of the bulk material collects in the space as defined by the cross-sectional expansion, a direct impacting of bulk material particles, which enter the elbow, upon the outer elbow wall surface is prevented. Even though this outer wall section is subjected to reduced wear, and thus such an elbow has a considerably increased life, the bag-like cross-sectional expansion causes an undesired pressure drop. Further, since bulk material accumulates in the formed pocket of the cross-sectional expansion, a removal of accumulating bulk material is difficult even when blow cleaning over an extended period. Thus, a complete cleaning, as required during a product change, necessitates a dismantling of the elbow.

It is also known to provide a 90° elbow in form of a pipe bend which includes at the outer elbow side a cross-sectional expansion in form of a substantially spherical chamber. At operation, this chamber is filled with bulk material particles to create a vortex or ball which rotates counterclockwise to the direction of deflection so as to impart the entering flow with the desired deflection without having bulk material particles impact the outer elbow wall surface. This design desires to lessen not only wear of the pipe bend but also the change in the particle structure as well as also formation of product abrasion and formation of so-called angel hair. However, practice has shown that the parting edge, by which the bulk material flow entering the elbow is split in a partial flow which is deflected and a partial flow which enters the chamber and rotates there, as well as the rotational motion of the bulk material particles in the spherical chamber promote the formation especially of superfine abrasion. Moreover, with certain types of bulk material, the aspired suspension of bulk material particles within the flow medium cannot be attained in the spherical chamber which thus becomes increasingly filled with stationary bulk material. Therefore, an elbow of this type displays the same drawbacks as those pipe fittings previously set forth, especially with regard to a cleaning prior to a product change.

Conventional 90° elbows are certainly also known which have the advantage of a low pressure drop and which are self cleaning. Still, the use of such conventional 90° elbows is disadvantageous as the outer elbow side is rapidly worn off and formation of angel hair is promoted which especially is encountered during dragging of granulated particles of polyolefine along the pipe wall, in particular when operating at high conveying speeds. These drawback could be eliminated by using T-pieces with a dummy third connection which is filled with bulk material up to the area of deflection between the first and second pipe connections, with the bulk material forming an interface in form of a baffle plate for the entering flow of bulk material; however, the use of such T-pieces is disadvantageous as they are not self-cleaning and result in a high pressure drop.

SUMMARY OF THE INVENTION

It is thus an object of the present invention to provide an improved 90° elbow obviating the afore-stated drawbacks.

In particular, it is an object of the present invention to provide an improved 90° elbow by which the formation of angel hair is eliminated and which is self-cleaning and causes a pressure drop which is not significantly higher than in a conventional quadrantal pipe bend of same nominal diameter.

These objects and others which will become apparent hereinafter are attained in accordance with the present invention by providing a pipe bend between an asymmetric cross-sectional expansion at the entrance side and an asymmetric cross-sectional contraction at the exit side, with the pipe bend having a quadrantal pipe shell at the inner elbow arch and a baffle plate at the outer elbow arch, with the baffle plate being oriented at an angle between about 55° and 65° relative to incoming flow direction.

Through provision of a 90° elbow which includes in combination an eccentric but continuous cross-sectional expansion, a baffle plate along the outer elbow arch, and an eccentric but continuous cross-sectional contraction, the existence of pockets or similar dead spaces is eliminated. The cross-sectional expansion allows a detachment of single bulk material particles from the pipe inner wall surface at freely floating flow (i.e. low charge) and an impacting upon the baffle plate where the particles are reflected and further transported by the stream. In contrast to conventional 90° elbows, the formation of strands and thus of angel hair is eliminated. Moreover, the particles are again accelerated very rapidly so that the pressure drop is low. At higher charges (strand flow), a thin layer of bulk material builds up upon the baffle plate and upon the neighboring area of the cross-sectional contraction and is slowly advanced in direction of flow along the baffle plate and neighboring pipe section. When conveying granular bulk material, the thickness of the layer is only in the range a few grain diameters. The entering particles are thus at least partially reflected by the baffle plate in an elastic collision so that a loss of velocity and thus a pressure drop is on average smaller compared to conventional 90° elbows.

Suitably, the pipe section at the entrance side of the elbow, which creates the cross-sectional expansion, may have an exit diameter which is approximately 1.2 times to 1.5 times the entrance diameter so that the 90° elbow according to the invention is suitable for conveyance of flow medium which is laden with bulk material to a high as well as low degree.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
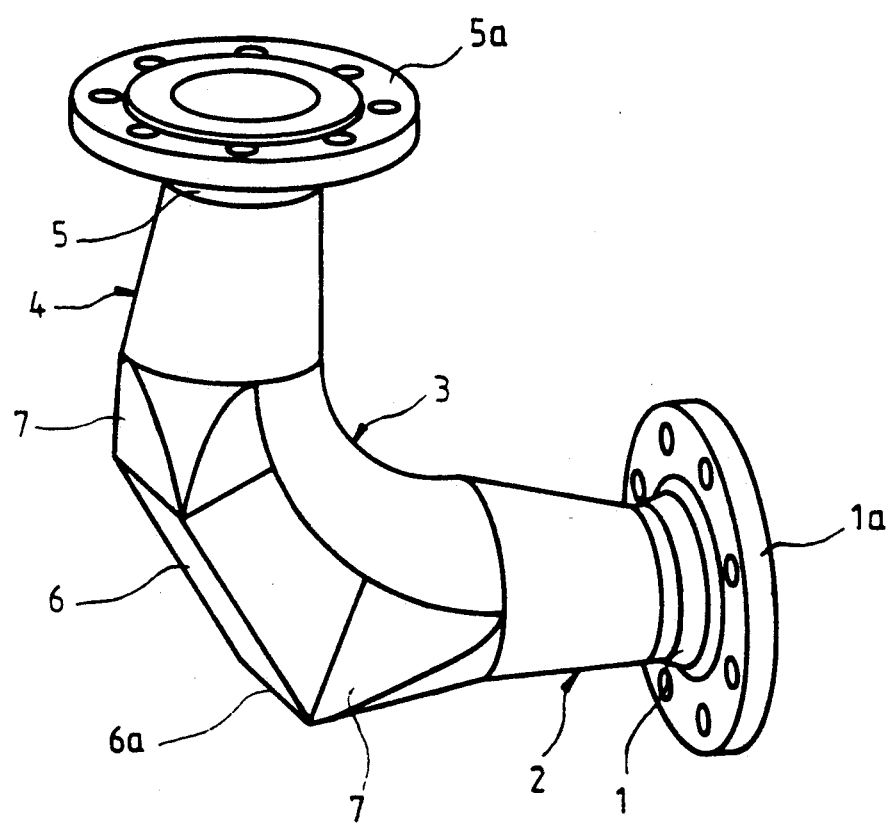
FIG. 1 is a perspective illustration of one embodiment of a 90°0 elbow according to the present invention.
Figure 2:
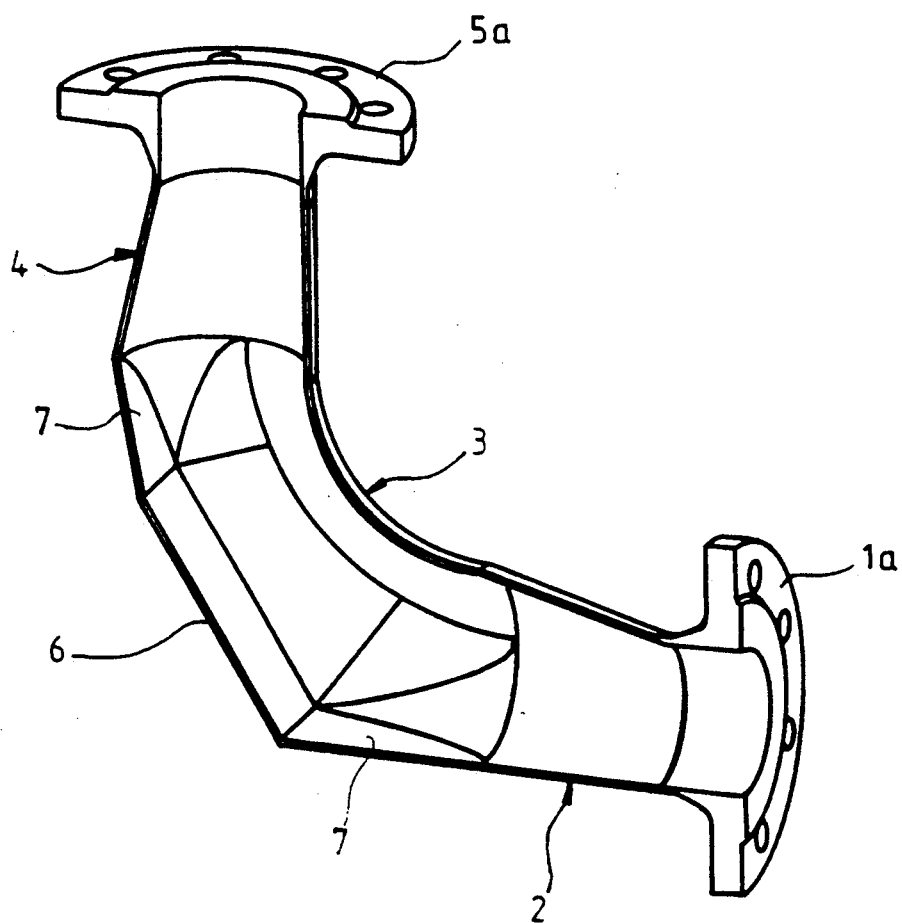
FIG. 2 is a perspective illustration of one half of the 90° elbow of FIG. 1, cut in longitudinal direction.

Throughout all the Figures, the same or corresponding elements are always indicated by the same reference numerals.

Referring now to the drawing, there is shown one embodiment of an elbow for connecting two pipes (not shown) at an angle of 90°. The elbow includes a cylindrical pipe socket 1 which is provided with a flange 1a for attachment to one pipe. At its flange-distant end, the pipe socket 1 is connected to a first pipe section which is generally designated by reference numeral 2. As shown in particular in FIG. 3, the first pipe section 2 includes a generally cylindrical shell 2a extending at the outer elbow side and connected to a flared upper shell 2b at the inner elbow side. Thus, the first pipe section 2 has a continuously conically expanding cross-sectional area if flow direction. Following the pipe section 2 is a pipe bend, generally designated by reference numeral 3 and including a quadrantal pipe shell 3a at the inner elbow arch and a baffle plate 6 in opposition to the pipe shell 3a. The baffle plate 6 is composed of a number of segments 7 which are suitably shaped to complement the quadrantal pipe shell 3a and to form a closed cross-sectional area. The pipe bend 3 is followed by a second pipe section 4, generally designated by reference numeral 4 and resembling the first pipe section 2. The second pipe section 4 includes a generally cylindrical shell 4a which extends at the inner elbow side and is connected to a tapered shell 4b which extends at the outer elbow side and by which the cross-sectional area of the pipe section 4 is continuously reduced.

Figure 3:
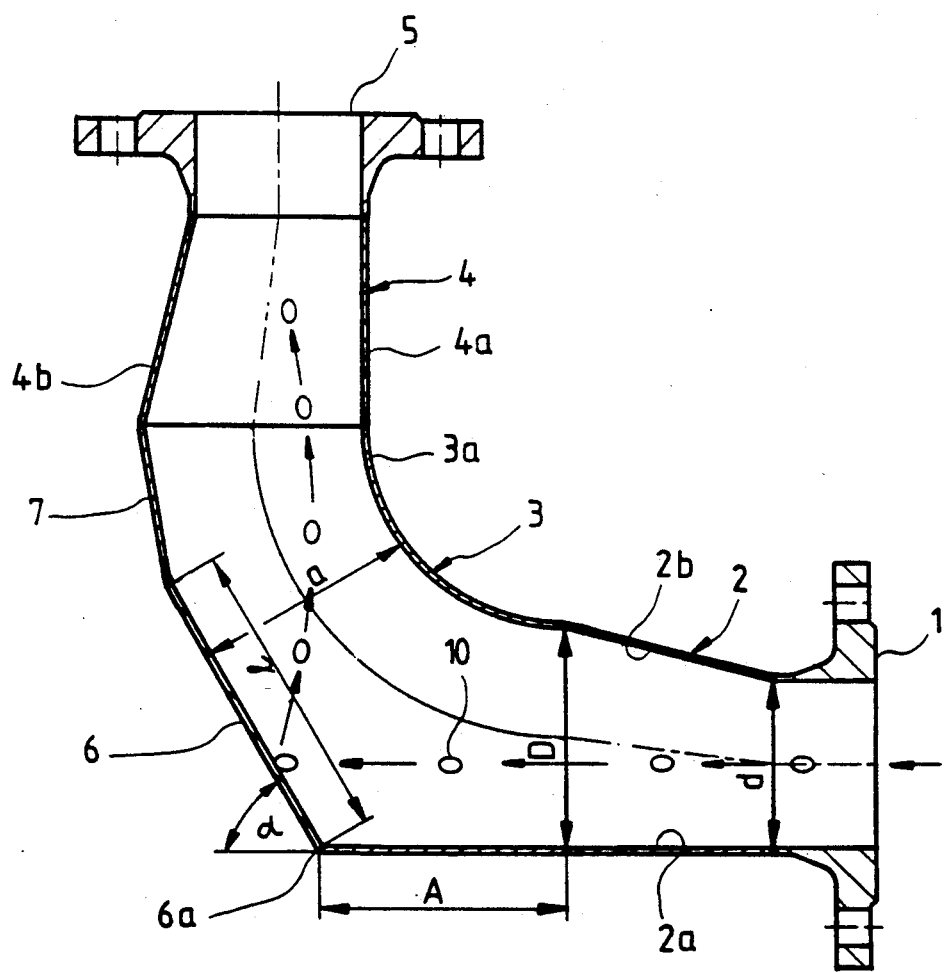
FIG. 3 is a schematic longitudinal section of the 90° elbow of FIG. 1.

In contrast to the first pipe section 2, with its cylindrical shell 2b extending at the outer elbow side, the second pipe section 4 is inverted, with the cylindrical shell 4a extending at the inner elbow side as shown in FIG. 3. The unilaterally tapered pipe section 4 ends in a diameter corresponding to the nominal diameter of a following pipe socket 5 which is provided with a flange 5a for attachment of the other pipe. The flow direction is indicated by arrow 8 (FIG. 3) and progresses from pipe socket 1 to pipe socket 5.

As shown in particular in FIG. 3, the cone angle of the conical shell 2b and/or the length of the first pipe section 2 are selected in such a manner that the bulk material particles, which are transported along the inner elbow wall surface of the cylindrical shell 2a, always detach from the wall surface in the area of the flared section of the first pipe section 2. Moreover, the conveying speed or floating speed is diminished by means of the cross-sectional expansion. A large part of conveyed bulk material particles follows the path as schematically indicated for one granular particle 10 in FIG. 3. Depending on the charge of the flow medium with bulk material, a relatively large percentage of granular particles 10 will directly impact the baffle plate 6 and be reflected in exit direction of the elbow or be deflected by other, preceding granular particles which are decelerated by the baffle plate 6 or already reflected. A most favorable reflection behavior or deflection behavior is accomplished when the baffle plate 6 is arranged at an angle a ranging between approximately 55° and 65° relative to the axis of the first pipe section 1 i.e. incoming flow direction of the bulk material.

The deflection of granular particles 10 is the gentler the lower the conveying speed or floating speed of the granular particles 10 in this area. An excessive reduction of the conveying speed should be prevented however, not only because the pressure drop increases the more the conveying speed is initially reduced and accordingly increased again at the exit side but also to avoid product deposits which can cause a clogging and impair the self-cleaning effect of the elbow. It has been found that a suitable compromise is attained when selecting the diameter D at the outlet side of the first pipe section 2 about 1.2 times to 1.5 time the diameter d at the entrance side of the first pipe section 2, with the diameter d corresponding to the nominal diameter of the pipe.

In order to maintain the enlarged cross section also in the area of the pipe bend 3, it is preferred to space the leading edge 6a at the entrance side of the baffle plate 6 from the exit side of the first pipe section 2 by a distance A which at least corresponds to the diameter D. In order to avoid an unnecessarily excessive volume of the elbow as well as an unnecessarily excessive magnitude of the angle of deflection, it is preferred to space the baffle plate 6 from the quadrantal pipe shell 3a by a minimum distance a which does not significantly exceed the diameter D. By meeting this condition, also the greatest value for the distance A is defined.

The baffle plate 6 has a length 1 which is determined by considering, on the one hand, that essentially all incoming particles 10 should impact the baffle plate 6 o the layer of particles formed upon the baffle plate 6, and on the other steady. Preferably, the length 1 is thus selected from about 1.5 times to 2 times the diameter d.

In the area following the baffle plate 6 i.e. primarily in the area of the second pipe section 4, the flow of bulk material is accelerated again by the cross-sectional contraction. For manufacturing reasons, but not necessarily for functional reasons, the second pipe section 4 is designed in a same manner as the first pipe section 2, i.e. with same configuration and same dimensions.

Additionally, it will be appreciated by persons skilled in the art that the individual elements of the elbow, i.e. sockets 1, 5, pipe sections 2, 4, pipe bend 3 and baffle plate 6, are connectable together by any suitable means, e.g. through welding.

Persons skilled in the art will understand that the 90° elbow according to the invention may have cross-sectional configurations which can differ from the previously set forth dimensions, as long as the cross-sectional area in the pipe bend is not smaller than the cross-sectional area of the first pipe section.

While the invention has been illustrated and described as embodied in a 90° elbow for pneumatic transport pipes, it is not intended to be limited to the details shown since various modifications and structural changes may be made without departing in any way from the spirit of the present invention.

What is claimed as new and desired to be protected by Letters Patent is set forth in the appended claims:

1. A 90° elbow adapted for use in pneumatic transport pipes and defining an inner elbow side and an outer elbow side, comprising:
   a first pipe socket for attachment of a pipe;
   a first pipe section defining an axis and being connected to said pipe socket, said first pipe section including a flared pipe shell extending at the inner elbow side to provide said first pipe section with a cross-sectional expansion expanding in a direction away from said first pipe socket;

a pipe bend including a quadrantal pipe shell connected to said flared pipe shell at the inner elbow side;

a second pipe section including a cylindrical shell which is connected to said quadrantal pipe shell at said inner elbow side, and a tapered pipe shell connected to said cylindrical shell at the outer elbow side to provide said second pipe section with a cross-sectional contraction contracting in a direction away from said quadrantal pipe shell;

said pipe bend further including a baffle plate arranged between said first pipe section and said second pipe section and connected thereto at the outer elbow side and being oriented relative to said axis of said first pipe section at an angle between 55° and 65°; and a second pipe socket connected to said second pipe section for attachment of another pipe.

2. The elbow defined in claim 1 wherein said second pipe section is of same dimensions as said first pipe section.

3. The elbow defined in claim 1 wherein said first pipe section has an entrance diameter and an exit diameter, said exit diameter being approximately 1.2 times to 1.5 times the entrance diameter.

4. The elbow defined in claim 1 wherein said first pipe section has an exit cross section defined by a diameter, said baffle plate having a leading edge which is distanced from said exit cross section by at least said diameter.

5. The elbow defined in claim 1 wherein said first pipe section has an exit cross section defined by a diameter, said baffle plate being spaced from s id quadrantal shell in a longitudinal sectional plane of the elbow by a distance of about said diameter of said exit cross section.

6. The elbow defined in claim 1 wherein said first pipe section has an entrance cross section defined by a diameter, said baffle plate having a length in direction of flow between 1.5 times to 2.0 times the diameter of said entrance cross section of said first pipe section.

7. A 90° elbow adapted for connecting one pipe to another pipe and defining an inner elbow side and an outer elbow side, comprising:

a first pipe section having first connecting means at one end for connection of the one pipe and including a continuously expanding cross section expanding in a direction away from said first connecting means at the inner elbow side;

a second pipe section having second connection means for connection of the other pipe and having a continuously reducing cross section reducing in a direction toward said second connecting means at the outer elbow side; and a pipe bend extending between and connected to said first and second pipe sections and including a baffle plate connected to and arranged at the outer elbow side at an angle between about 55° and 65° relative to the incoming flow through said first pipe section of bulk material.

* * * * *